(12) United States Patent
McClintock et al.

(10) Patent No.: US 9,020,108 B1
(45) Date of Patent: *Apr. 28, 2015

(54) METHODS AND SYSTEMS FOR CONFIRMING MESSAGE DELIVERY (71) Applicant: Callwave Communications, LLC, Santa Barbara, CA (US)

(72) Inventors: David C. McClintock, Santa Barbara, CA (US); David S. Trandal, Santa Barbara, CA (US)

(73) Assignee: Callwave Communications, LLC, Brookline, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,887

(22) Filed: May 19, 2014

Related U.S. Application Data

(63) Continuation of application No. 13/532,450, filed on Jun. 25, 2012, now Pat. No. 8,731,147, which is a continuation of application No. 11/951,106, filed on Dec. 5, 2007, now Pat. No. 8,218,736.

(60) Provisional application No. 60/873,406, filed on Dec. 7, 2006.

(51) Int. Cl.
*H04M 1/64* (2006.01)
*H04M 1/658* (2006.01)
*H04W 4/12* (2009.01)
*H04M 1/725* (2006.01)

(52) U.S. Cl.
CPC ............... *H04M 1/658* (2013.01); *H04W 4/12* (2013.01); *H04M 1/7255* (2013.01)

(58) Field of Classification Search
CPC .............. H04M 3/533; H04M 3/5333; H04M 3/53341; H04M 3/537
USPC .................................. 379/88.12, 88.22–88.25
See application file for complete search history.

(56) References Cited

U.S. PATENT DOCUMENTS

| | | | |
|---|---|---|---|
| 5,533,106 A | 7/1996 | Blumhardt | |
| 5,568,540 A * | 10/1996 | Greco et al. | ............... 379/88.25 |
| 5,651,054 A | 7/1997 | Dunn et al. | |
| 5,805,587 A | 9/1998 | Norris et al. | |
| 5,862,208 A | 1/1999 | MeLampy et al. | |
| 5,894,504 A | 4/1999 | Alfred et al. | |
| 5,946,386 A | 8/1999 | Rogers et al. | |

(Continued)

FOREIGN PATENT DOCUMENTS

| | | |
|---|---|---|
| EP | 1 120 954 | 8/2001 |
| JP | 10-513632 | 12/1998 |

(Continued)

*Primary Examiner* — Simon Sing
(74) *Attorney, Agent, or Firm* — Knobbe, Martens, Olson & Bear LLP (57) ABSTRACT

Methods and systems for processing messages and providing notifications regarding the same are described. An optional embodiment includes a telecommunications interface, a data network interface, and an answering system coupled to the telecommunications interface and the data network interface, the call processing system configured to receive a first call from a caller via the telecommunications interface, store a message from the caller, transmit a message notification using the data network to the intended recipient of the call via which the intended recipient can access the message, and transmit information related to the intended recipient's receipt of the message.

30 Claims, 5 Drawing Sheets

(56) References Cited

U.S. PATENT DOCUMENTS

| | | |
|---|---|---|
| 6,031,896 A | 2/2000 | Gardell et al. |
| 6,100,873 A | 8/2000 | Bayless et al. |
| 6,175,622 B1 | 1/2001 | Chiniwala et al. |
| 6,216,106 B1 | 4/2001 | John |
| 6,233,318 B1 | 5/2001 | Picard et al. |
| 6,337,898 B1 | 1/2002 | Gordon |
| 6,353,660 B1 | 3/2002 | Burger et al. |
| 6,374,102 B1 | 4/2002 | Brachman et al. |
| 6,477,246 B1 | 11/2002 | Dolan et al. |
| 6,526,127 B1 | 2/2003 | Piotrowski et al. |
| 6,529,587 B1 | 3/2003 | Cannon et al. |
| 6,535,585 B1 | 3/2003 | Hanson et al. |
| 6,658,100 B1 | 12/2003 | Lund |
| 6,661,785 B1 | 12/2003 | Zhang et al. |
| 6,661,886 B1 | 12/2003 | Huart et al. |
| 6,865,260 B1 | 3/2005 | Meadows et al. |
| 6,879,677 B2 | 4/2005 | Trandal et al. |
| 6,898,275 B2 | 5/2005 | Dolan et al. |
| 6,950,502 B1 | 9/2005 | Jenkins |
| 6,965,917 B1 | 11/2005 | Aloni et al. |
| 6,980,641 B1 * | 12/2005 | Stanford et al. ............ 379/354 |
| 6,999,566 B1 | 2/2006 | Eason et al. |
| 7,027,567 B1 | 4/2006 | Scott et al. |
| 7,103,167 B2 | 9/2006 | Brahm et al. |
| 7,120,455 B1 | 10/2006 | Chen et al. |
| 7,308,081 B2 | 12/2007 | Trandal et al. |
| 7,397,910 B2 | 7/2008 | Dolan et al. |
| 7,447,510 B2 | 11/2008 | Celik et al. |
| 7,499,973 B2 | 3/2009 | Couts et al. |
| 7,548,756 B2 | 6/2009 | Velthuis et al. |
| 7,555,110 B2 | 6/2009 | Dolan et al. |
| 7,636,428 B2 | 12/2009 | Brahm et al. |
| 7,688,958 B2 | 3/2010 | Dolan et al. |
| 7,725,541 B2 | 5/2010 | Daniell et al. |
| 7,822,188 B1 | 10/2010 | Kirchhoff et al. |
| 8,073,429 B2 | 12/2011 | Karaoguz et al. |
| 2003/0063731 A1 | 4/2003 | Woodring |
| 2003/0123629 A1 | 7/2003 | Hussain et al. |
| 2003/0185375 A1 | 10/2003 | Albal |
| 2003/0191823 A1 | 10/2003 | Bansal et al. |
| 2004/0076272 A1 | 4/2004 | Zafar et al. |
| 2005/0010573 A1 | 1/2005 | Garg |
| 2005/0078612 A1 | 4/2005 | Lang |
| 2005/0186978 A1 | 8/2005 | Lin |
| 2005/0265322 A1 | 12/2005 | Hester |
| 2005/0286498 A1 | 12/2005 | Rand et al. |
| 2005/0287993 A1 | 12/2005 | Gogic |
| 2006/0063541 A1 | 3/2006 | Ryu |
| 2006/0168015 A1 | 7/2006 | Fowler |

FOREIGN PATENT DOCUMENTS

| | | |
|---|---|---|
| JP | 11-506292 | 6/1999 |
| JP | 2001-168989 | 6/2001 |
| WO | WO 97/26749 | 7/1997 |
| WO | WO 01/76210 | 10/2001 |

* cited by examiner

FROM: DeliveryReceipt@CallWave.com

A <message duration> sec message sent via email to <called party name>. Get your free account now: Reply with your email address, or visit www.vm2em.com

*FIG. 5*

FROM: DeliveryReceipt@CallWave.com

<Called party name> has just heard the message you left on Jan. 21 at 2:33PM. Get your free account now: Reply with your email address, or visit www.vm2em.com

*FIG. 6*

METHODS AND SYSTEMS FOR CONFIRMING MESSAGE DELIVERY

CROSS-REFERENCE TO RELATED APPLICATIONS

This application is a continuation of U.S. application Ser. No. 13/532,450, filed Jun. 25, 2012, which is a continuation of U.S. application Ser. No. 11/951,106, filed Dec. 5, 2007, now U.S. Pat. No. 8,218,736, which claims priority from U.S. Patent Application No. 60/873,406, filed Dec. 7, 2006, the contents of which are incorporated herein in their entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

FIELD OF INVENTION

The present invention is related to telecommunications, and in particular, to methods and systems for providing telecommunications services.

DESCRIPTION OF RELATED ART

Certain conventional telephone answering systems, such as those that are operated by carriers, record messages and make the messages available to subscribers. These messages can be retrieved through a telephone user interface (TUI), and in some cases, the messages are transmitted to an email address and/or a telecommunication client application running on a personal computer.

SUMMARY OF THE INVENTION

Methods and systems are described that enable a caller leaving a message to request a message delivery notification when the message is delivered and/or reviewed by the message recipient.

An example embodiment provides a method of processing a call and providing voice message status information, comprising: receiving at a call processing system a first call from a caller intended for a first person; playing a message to the caller indicating that the caller can record a voice message for the first person; recording a caller voice message; transmitting over a data network to a terminal associated with the first person a notification regarding the first call, wherein the first person can access the caller voice message via the terminal associated with the first person; at least partly in response to detecting that the first person has accessed the voice message, transmitting a notification to a terminal associated with the caller indicating that the first person has accessed the voice message.

An example embodiment provides a method of providing a message receipt notification, comprising: receiving at a first system a call from a caller intended for a called party; receiving a caller message during the call; providing a notification related to the message to the called party; and at least partly in response to receiving a first indication that the called party is aware of the message, transmitting a corresponding status notification to the caller.

An example embodiment provides a system for transmitting message status information, comprising: a telecommunications interface; a data network interface; and an answering system coupled to the telecommunications interface and the data network interface, the call processing system configured to receive a first call from a caller via the telecommunications interface, store a message from the caller, transmit a message notification using the data network to the intended recipient of the call via which the intended recipient can access the message, and transmit information related to the intended recipient's receipt of the message.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

The present invention is related to telecommunications, and in particular, to methods and systems for providing subscribers or other users with telecommunications services.

GLOSSARY

AIN—Advanced Intelligent Network
CCI—Common Channel Interoffice
CCS—Common Channel Signaling
CP—Carrier Partner
HTML—Hypertext Markup Language
HTTP—Hypertext Transfer Protocol
IP—Intelligent Peripheral
MMS—Multimedia message service
MSC—Mobile Switching Center
SCP—Service Control Point
SMS—Short Message Service
SS7—Signaling System 7
SSP—Service Switching Point
URL—Uniform Resource Locator
System and Operation Description
VoIP—Voice Over Internet Protocol Certain embodiments provide methods and systems that enable a caller to a call answering system to request a message delivery notification and/or related status information, such as when the message is delivered and/or reviewed by the message recipient. By way of example, the delivery notification can take the form of a text message (e.g., a SMS to a cell phone, instant messaging client, or telecommunication client), a graphical message (e.g., an MMS message), a voice message (e.g., a voice message sent to an MMS capable phone), or a phone call.

Providing callers with a message delivery notification option can increase the likelihood a caller will leave a message for the called party, thereby benefiting the caller and the called party. This message delivery notification process for the caller enables the service provider to improve the overall calling experience, thereby increasing the attractiveness and value of the service provider's telecommunications service offering.

The message delivery notification transmitted to the caller optionally includes a promotional message for the service provider's service and/or other products/services. Providing a promotional message for the service provider's services or other products/services in the notification can reduce the provider's customer acquisition costs and/or can generate advertising revenues (e.g., from third parties paying a fee or benefit for the inclusion of promotional messages/links in such notifications/messages). In addition, it provides an efficient way for consumers to learn about worthwhile services.

In an example embodiment, a telecommunications system provides subscribers with a call answering service for one or more of their telecommunication devices (e.g., their home landline phone, office landline/pbx phone, mobile cell phone, and/or VoIP phone). On a "missed" call (e.g., where the call is not answered because of a busy, do not disturb, forward all calls to an answering service, or no answer condition), the caller is presented with an option to leave a message (e.g., a voice message) for the called party. Optionally, the caller is offered the option to receive a message delivery notification.

By way of example, the option to receive a message delivery notification can be offered via an audible prompt played by the system (e.g., so that the caller can hear the prompt via the calling telecommunications device/phone), or via a visual user interface (e.g., if the caller's telecommunication device is equipped to receive and has a display capable of displaying such a user interface (e.g., a smart phone, a personal computer or television configured to handle IP, landline, or cellular calls)). If the message delivery notification option is selected by the caller (e.g., via a voice instruction, a keypad press, or other appropriate user input, or by the failure to provide a user input within a specified period of time), the call processing system transmits a delivery notification optionally when the message (e.g., voice message, fax message, etc.) is delivered and/or reviewed by the called party. Optionally the caller and/or the called party can specify via a corresponding user interface whether the message delivery notification is to be delivered when the message is delivered, when the message is reviewed (e.g., listened to) by the called party, or whether a notification is to be provided when the caller's message is delivered to the called party and when the message is reviewed by the called party. For example, the called party may have specified when such notifications are to be delivered to a caller via an account management user interface (e.g., accessed as a Web page via a Web site hosted by the system). The caller may be audibly prompted to specify when such notifications are to be provided via an audible prompt (e.g., using an interactive voice response system) or via a visual prompt.

Optionally, the message and/or message delivery notification includes a promotion of the telecommunication service provided by the service provider.

Certain embodiments of the call processing system provide call notification and messaging services using triggers, such as SS7 Advanced Intelligent Network (AIN) triggers. In an example embodiment, to support this service, the service provider configures a trigger at the appropriate points in an inbound and/or outbound call for a customer/subscriber. In an example embodiment, when a certain trigger fires, a softswitch (e.g., acting as a Service Control Point (SCP) in the SS7 network, and connecting calls from one phone line to another, using, for example, software running on a computer system), receives a query that enables the softswitch to control, at least in part, the call and optionally to control the visual presentation of the call (or message) to the caller, and/or the called party.

In an example embodiment, enhanced call management and call routing services are provided via Common Channel Signaling (CCS) or Common Channel Interoffice Signaling (CCIS) information, such as, by way of example, via SS7 Intelligent Network (IN) triggers in the switches of local exchange telephone companies. For example, SS7 AIN triggers are set in the switches of carriers, such as Carrier Partners (e.g., carriers who are partners with a third party call processing operator in providing enhanced call processing services) to provide calling services. In another example, SS7 Wireless Intelligent Network (WIN) triggers are set in the mobile switches of wireless carriers, such as wireless carrier partners, to provide calling services. In another example, Non-Intelligent Network Signaling (e.g., ISDN, CLASS Call Forwarding services) is used to originate, terminate, forward, and bridge calls.

Throughout the following description, the term "Web site" or "Web" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

Further, while the description herein refers to example network and telephony standards and protocols, other standards and protocols can be used as well. In addition, while references may be made to electronic address books or contact lists, other data stores and formats can be used to store contact information. While certain intelligent network triggers are referred to herein, other triggers, events, or services can be used as well, such as call forwarding, call bridging, call origination, and call termination for example. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a networked-enabled personal digital assistant (PDA), a networked game console, a networked entertainment device, a smart phone, and so on. While certain references are made to certain example system components or services, other components and services can be used as well. In addition, while certain user inputs are described as being provided via phone key presses or by clicking on a button, optionally, user inputs can be provides using other techniques, such as by voice or otherwise. While certain phone numbers are referenced for purposes of illustration, other phone numbers or electronic addresses or locators can be used as well.

While some examples refer to certain example messaging protocols (e.g., SMS or MMS) for illustrative purposes, other messaging protocols can be used as well (e.g., instant messaging, email, etc.).

In addition, certain call management capabilities described herein make use of a telecommunications client (e.g., a personal computer client, a client hosted on an interactive television, a network personal digital assistant, a smart phone, or a wireless phone with an Internet connection, etc.) to give the customer access to and management of calls (e.g., see example user interface illustrated in FIG. 2 discussed in greater detail below). Optionally, a widget (e.g., embedded on a web page) can be used to provide some or all of the client application functionality.

For example, the user interface (e.g., presented via a discrete application or a web page-embedded widget) can enable a user to reply to, play, rewind, delete, and forward a received message and/or log entry to another person/address. Optionally, a user can have multiple clients hosted on multiple computers or other hosts.

In an example embodiment, the telecommunications client application connects to and communicates with a softswitch via the Internet, an intranet, or other network. The client application, executing on a subscriber's computer terminal or other host, can make the subscriber's online presence known to the softswitch (e.g., by transmitting a message over the Internet to the softswitch). Optionally, the client can be used to receive, edit, and display call log data from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call voice or fax, etc.), and/or call alert data (e.g., for an active call, listing the caller phone number, name, city/state, and/or call status (e.g., ringing, playing greeting, recording caller message, terminating call, displaying fax)). Optionally, the call alert also plays an audible signal, such as a ring tone or can cause the client host to vibrate if the client host is equipped with a vibration device (e.g., a wireless phone with a vibrate mode).

The client application can display a log of recorded messages from callers, and optionally can provide playback controls (e.g., play, fast forward, rewind) for playing back or displaying the recorded message (e.g., a voice message, a video message, a fax message, etc.) via the client computer terminal. The client optionally can also be used to screen calls (e.g., wherein the softswitch streams a message being left by a caller to the client so that the called party can listen to the message in substantially real time) and to instruct the softswitch to accept calls on the host computer terminal, forward calls, refuse calls, initiate call conferencing, and to otherwise provide call handling instructions. Options are also provided in the client to respond to calls using a text reply option and/or multimedia reply option. In addition, options are provided via a user interface whereby a user can search their contact database and/or the web.

For example, when a call alert is received by the client, as part of call presentation, a ringing sound is optionally played via the client host (and/or the host's vibrates). Optionally, the incoming call is displayed in a call alert user interface for a first amount of time (e.g., a set time, such as 5 seconds, or for a user configurable period of time), and then the call appears in the associated call log.

Figure 3:
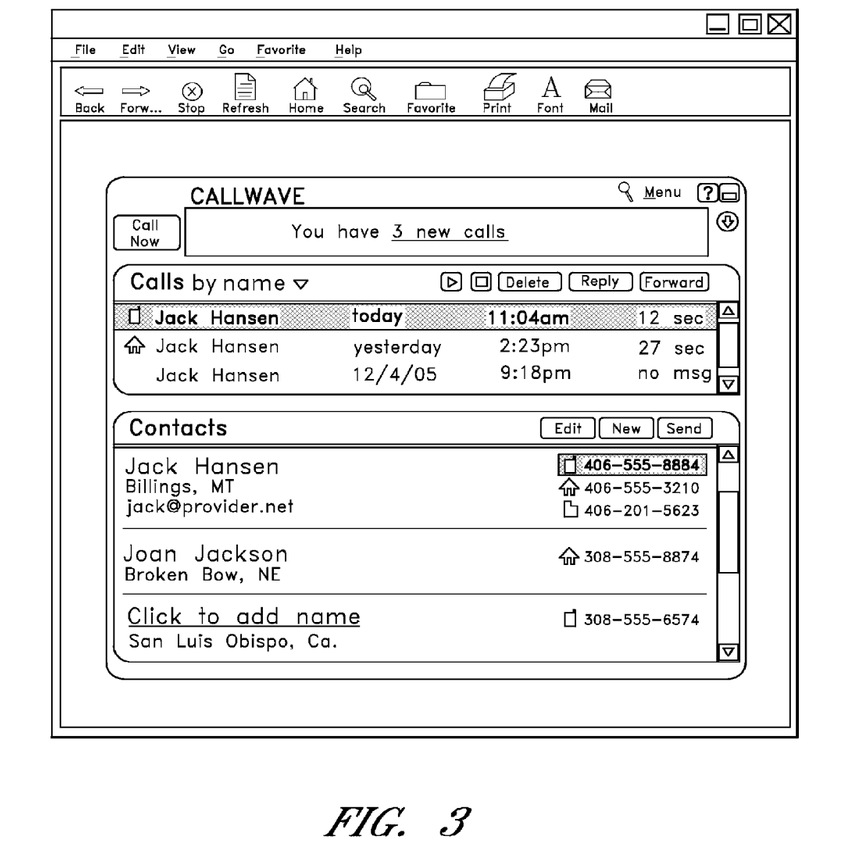
FIG. 3 illustrates a second example web-based telecommunications client call log and user contacts user interface with Reply, Forward, and Send buttons.

A telecommunications client is just an example user interface. FIG. 3 illustrates another example call log and client user interface presented via a browser to a customer. The browser can be executing on a computer terminal, such as a personal computer, a Wireless Application Protocol (WAP)-enabled phone, a PDA, an interactive television, or the like. The call log can be accessed by supplying the appropriate URL to the browser and optionally providing log-on information, such as a user name and a password. FIG. 3 is discussed in greater detail below.

The functionality, operation, and implementation for an example service promoting and registering subscribers to telecommunications services will now be described in further detail.

Figure 1:
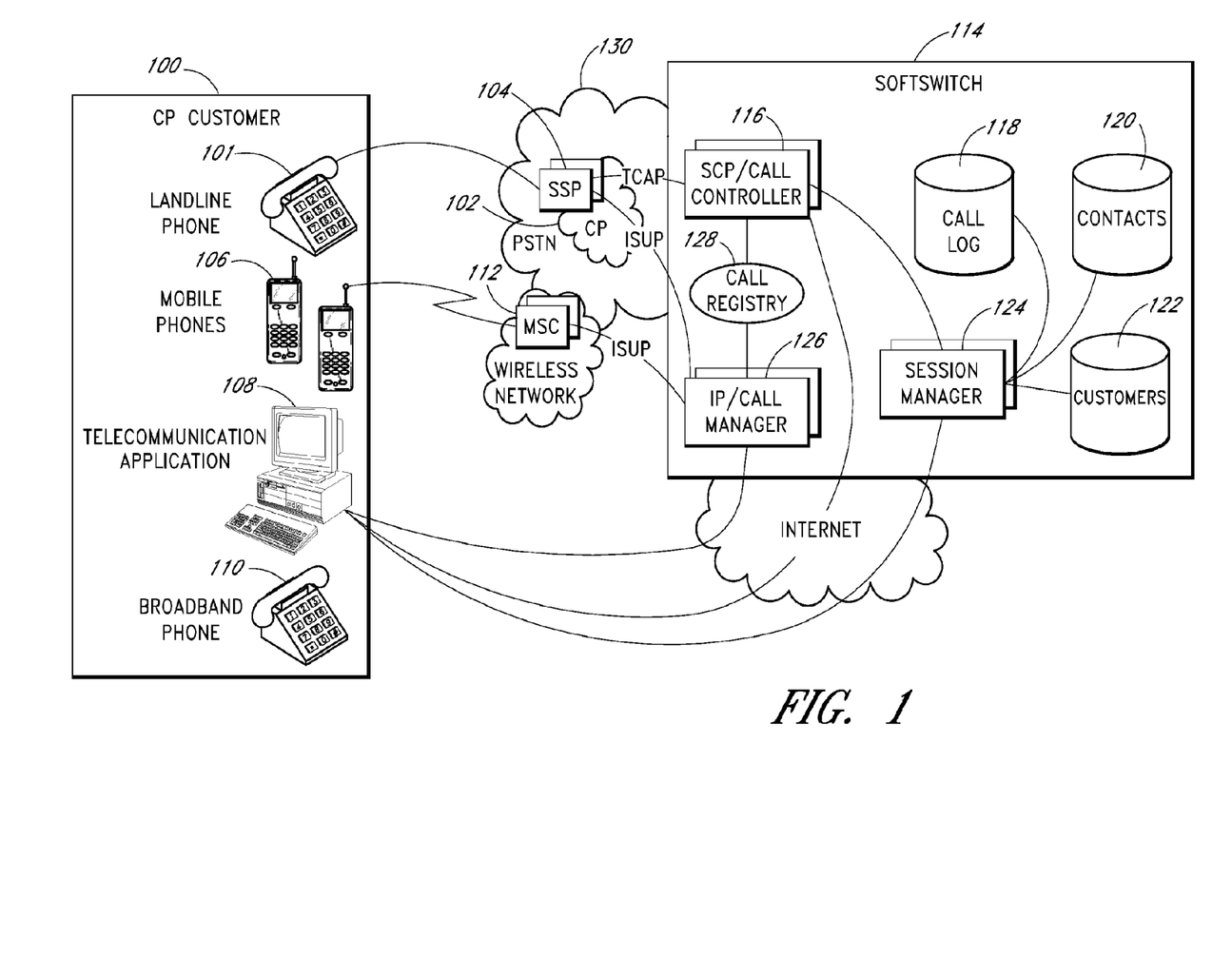
FIG. 1 illustrates an example network operating environment for advanced telecommunications services.

FIG. 1 illustrates an example telecommunications network environment via which enhanced services can be provided.

A service provider or carrier (e.g., a Carrier Partner) customer 100 may have one or more landline phones 101 that connect to a local exchange switch or an SSP (Service Switching Point) 104 in the carrier's network 102. The customer may also have one or more mobile phones 106 and one or more hosts 108 (e.g., personal computers, networked televisions, personal digital assistants, smart phone, etc.) running a telecommunications client. In addition, a customer may have one or more phones 110 connected to a broadband connection (e.g., via a cable modem or DSL modem) wherein the phone (e.g., an analog phone coupled to an analog phone adapter (ATA), a VoIP phone, a Skype phone, etc.) digitizes and packetizes voice data before transmitting over the broadband connection (e.g., using SIP or other protocol) to a call routing service provider or other destination.

The telecommunications client has one or more user interfaces that display some or all of the following: a call log, text messages, a contact record/list, an optional automated character, and active, in-progress calls. In an example embodiment, the customer can elect to screen or take an active call or respond to a caller with a message that will be viewable by the caller, such as a text message or a multimedia message (e.g., an SMS message or MMS message). Optionally, calls can also be made (originated) via the telecommunications client (e.g., where the host is equipped with a speaker and microphone).

Optionally, information about a caller can be retrieved through a search function (e.g., wherein information regarding the caller is searched for over the Internet and/or via proprietary databases, such as databases reflecting an individual's or company's credit worthiness). For example, the client (or a Web-based interface accessed via a browser) optionally provides user interfaces including one or more search fields that receives search queries (e.g., in the form of search strings, specified time frames, etc.) related to calls (e.g., call log entries, voice messages, fax messages) and/or contacts (e.g., a contact name, address, company, phone number, email address, etc.), transmits the queries to a search engine (e.g., a local search engine or a remote search engine hosted by the softswitch 114), which locates corresponding search results.

In this example, the softswitch 114 has a number of optional components, some of which are optionally centralized at a given location, others of which may be co-located in the carrier's network (e.g., to reduce network transport costs). A SCP (Service Control Point) 116 is an optional AIN component that interacts with the SSPs 104 (e.g., using the TCAP protocol). In an example embodiment, triggers, such as AIN triggers, are armed for the customer's phone number/address/ account (e.g., landline phone line) so that when calls are made to or from a corresponding phone, a trigger fires and causes the SSP 104 to query the SCP 116 for instructions on how to handle the call. The SCP 116 is optionally also configured to perform TCAP queries to other SS7 components as needed by some services (e.g., request Automatic Callback from another carrier's switch when a line becomes idle).

In an example non-AIN deployment, the softswitch 114 optionally interconnects with the PSTN 130 using, by way of example, SS7 signaling. In this case, in an example embodiment, the SS7 signaling information associated with a call terminates on a Call Controller subsystem 116 or the like, and the trunks (or bearer channels) terminate on one or more Call Managers 126 (described further below). Optionally, the Call Controller subsystem 116 and/or associated functions thereof, are included in the Call Manager subsystem 126.

In an example IP (e.g., VoIP) deployment scenario, the softswitch 114 interconnects with the PSTN 130 through an IP connection using, for example, Session Initiated Protocol (SIP) signaling. The IP network is optionally directly connected to Internet devices, or calls are gatewayed from IP-to-PSTN at Network Points-of-Presence (NetPOP) which provide access points to the Internet.

In an example embodiment, triggers, such as SS7 Wireless Intelligent Network (WIN) triggers, are set in the mobile switches of one or more wireless carriers (e.g., Wireless Carrier Partners) to provide similar calling services as described herein with respect to a landline phone for a customer's mobile phone number/address/account.

In an example embodiment, the softswitch 114 also contains one or more systems referred to as Call Managers 126. The Call Managers 126 are connected to the PSTN 130 (e.g., via ISDN using the ISUP protocol, by way of example, although other protocols can be used). The Call Managers 126 provide some or all of the following: provide a call screening service, record a message from a caller that is to be recorded, provide a voice prompt or message that is to be played to a caller and/or called party, record a facsimile document, detect speech or DTMF tones, convert speech that needs to be converted to text, and/or provide a gateway between the SS7-based networks (PSTN) and SIP-based networks (VoIP).

The example Call Manager 126 optionally can also act as an IP (Intelligent Peripheral), another AIN component that the SCP 116 can instruct the SSP 104 to connect into the call for interaction with the called and calling party. The IP/Call Managers 126 and SCPs 116 in the softswitch 114 optionally share a Call Registry 128 that stores information about active calls. The IP/Call Managers 126 optionally can interconnect with a mail relay for sending text/voice messages to other messaging services such as an email system or Short Message Service Center.

One or more Session Managers 124 (e.g., in the softswitch 114) optionally track telecommunication client presence and interact with a given telecommunications client (e.g., a client application hosted on a personal computer, PDA, smart phone, or a networked television) as call log, contact, and/or customer data needs to be synchronized with one or more databases (e.g., centralized or distributed databases, such as a call log database, 118, a contacts database 120, and/or a customers database 122) to provide the customer, via the client, with updated log, contact, and/or customer data.

The Session Manager(s) 124 also optionally provide the SCP in an AIN environment and the Call Manager in a non-AIN environment with service configuration information for the customer involved in a call. During an active call, the SCP 116 and/or IP/Call Manager optionally directly or indirectly interact with the telecommunications client to provide call progress information, and to stream audio and/or visual content.

The softswitch 114 in this example contains centralized databases and/or a general-purpose storage area, optionally including, but not limited to, some or all of the following: a call log database 118, a contacts database 120, and a customer database 122. Optionally, the databases are not centralized and may be distributed geographically and/or over different systems. The call log database 118 stores call events and related data for incoming and/or outgoing calls and text and/or multimedia messages. The contacts database 120 stores information and parameters (e.g., names, identifiers, and/or phone numbers/addresses, birthdays, notes, automated characters, etc.) associated with a sender, called, or calling party. The customer database 122 stores information and parameters (e.g., account data and configuration information) associated with subscribers/customers/users. For example, the database 122 optionally stores a message delivery threshold limit specify how many message delivery notifications are permitted within a specified period of time (e.g., per day, week, month). If the threshold limit is exceeded (as tracked by the system 114) additional message delivery notifications will not be provided within the specified time period.

The softswitch call processing system 114 optionally includes other subsystems (not shown), such as some or all of the following: a router subsystem, which serves as an interface to the Internet to manage communications between online IP client devices and call processing servers, a web server subsystem to manage a "web site" associated with the softswitch (e.g., via which a user can access an account set-up/configuration user interface, a call log, a contacts database, etc., using a browser or other network user interface), etc. These subsystems are optionally interconnected via a Local Area Network (LAN), a Wide Area Private Network (WAN), and/or a Wide Area Public Network (e.g., Internet). The call manager 126 can communicate with the mobile phones 134 across the PSTN 108 over a wireless network 112 via the corresponding MSC 110.

Internet protocol (IP) telephony, such as VoIP (voice over Internet protocol), may use, in whole or in part, the Session Initiation Protocol (SIP) as the signaling protocol. SIP is a standardized signaling protocol which can be used for Internet conferencing, telephony, presence, events notification and instant messaging. The Session Initiation Protocol is currently an Internet Engineering Task Force (IETF) standard protocol. There may be several versions and implementations of SIP. SIP, by way of example, enables one or more of the following services to be provided, using proxy servers and end user client systems:

1. Call forwarding: call forwarding can be provided in response to one or more of the following conditions: ring-no answer, busy, unconditional call forwarding, address manipulations (such as permanent numbers (e.g., 700 numbers), free phone numbers (e.g., 800, 866 numbers), and paid information numbers (e.g., 900 numbers)).
2. Call recipient and calling number identification
3. Personal mobility
4. Caller and call recipient authentication
5. Invitations to a multicast conference
6. Basic Automatic Call Distribution (ACD)

A call may be routed partially over the Internet, using SIP, and partially over a circuit-switched network, such as a PSTN (public switched telephone network) or wireless network. The PSTN and wireless networks may utilize a variety of signaling and other standards, such as the SS7 signaling protocol.

SIP is a request-response protocol. In one embodiment, SIP can be used for establishing, manipulating and tearing down user sessions, wherein several users can optionally participate in a session. A session can optionally involve multimedia elements including audio, video, instant messaging, and/or other real-time data communications. By way of further example, a session can be an Internet multimedia conference, an Internet telephone call and/or a multimedia distribution session. Optionally, session members can communicate using multicast and/or using a mesh of unicast relations.

SIP can optionally run over UDP (User Datagram Protocol), TCP, IP, ATM, X.25 and/or other protocols. In one embodiment, SIP can work in the Application layer of the Open Systems Interconnection (OSI) communications model.

By way of example, SIP invitations can be used to create sessions. The invitation can carry session descriptions that enable participants to agree on a set of compatible media types. SIP enables user mobility by providing proxy services and redirecting requests to the user's current location. For example, users can register their current location so that calls can be directed to a telephone or other terminal corresponding to the location.

An example system that can be used to support SIP can include some or all of the following components:

An endpoint component, sometimes referred to as a user agent (UA), which can be a hardware and/or software device implementing or compatible with SIP, such as an Internet Protocol (IP) phone or other terminal. The endpoint components can include a client used to initiate calls and a server used to answer calls. By way of further example, a SIP Proxy, a SIP phone, a call processing system, and so on, can be SIP endpoints.

A SIP network server that handles signaling associated with one or more calls. By way of example, in an optional embodiment, the network server provides name resolution and user location. The SIP network server can include one or more additional servers. For example, the SIP server can include a Register server used to receive registration messages from endpoints regarding current user location. Using a mapping database, the Register server can map the SIP addresses with the physical location or locations in the domain where the endpoint is located.

The SIP network server can also include a proxy system that transmits call setup and tear down information and optionally forwards SIP messages to multiple proxy servers, creating a search tree, in order for the SIP messages to reach their destination. In addition, a SIP proxy can discover endpoint characteristics of an endpoint by consulting a list of registration templates, including dynamic configuration parameters, for that endpoint. The network server can also include a SIP Redirect server that enables endpoints to locate a desired address by redirecting one or more of the endpoint to another server.

SIP addresses can be the form of uniform resource locators (URL). By way of example, SIP addresses can optionally be embedded in Web pages. In certain applications, a user can click on a SIP address embedded in a Web or other electronic document, and in response, a call can be placed from the user terminal to the SIP address, and the user can then talk to the person or system associated with the SIP address and/or send data files to the person or system associated with the SIP address.

When making a SIP call using a SIP terminal, the SIP terminal locates the appropriate server and then sends a SIP request, such as an invitation that initiates a session. The request may directly reach the intended call recipient, or the request may be redirected or may trigger a chain of new SIP requests by proxies. If a call is to be routed through a number of different proxy servers, a redirect server can be used. When a caller's user agent sends an INVITE request to the redirect server, the redirect server contacts the location server to determine the path to the called party, and then the redirect server sends that information back to the caller. The caller terminal then acknowledges receipt of the information. The caller terminal then sends a request to the device indicated in the redirection information (e.g., the call recipient terminal or another server that will forward the request). Once the request reaches the call recipient terminal, the recipient terminal transmits a response and the caller acknowledges the response.

The Real Time Protocol (RTP), Real Time Control Protocol (RTCP), and/or other appropriate protocols can be used to send audio using packets over the Internet to allow the caller and call recipient to verbally communicate. By way of example, the packets can optionally be UDP packets.

Optionally, calls directed to one more selected numbers can be routed by a SIP provider to a call processing system optionally operated by a separate entity than the SIP provider. The call processing system optionally provides telephone services by integrating with one or more Internet Services Providers (ISP), SIP providers and/or other telephony providers.

Figure 2:
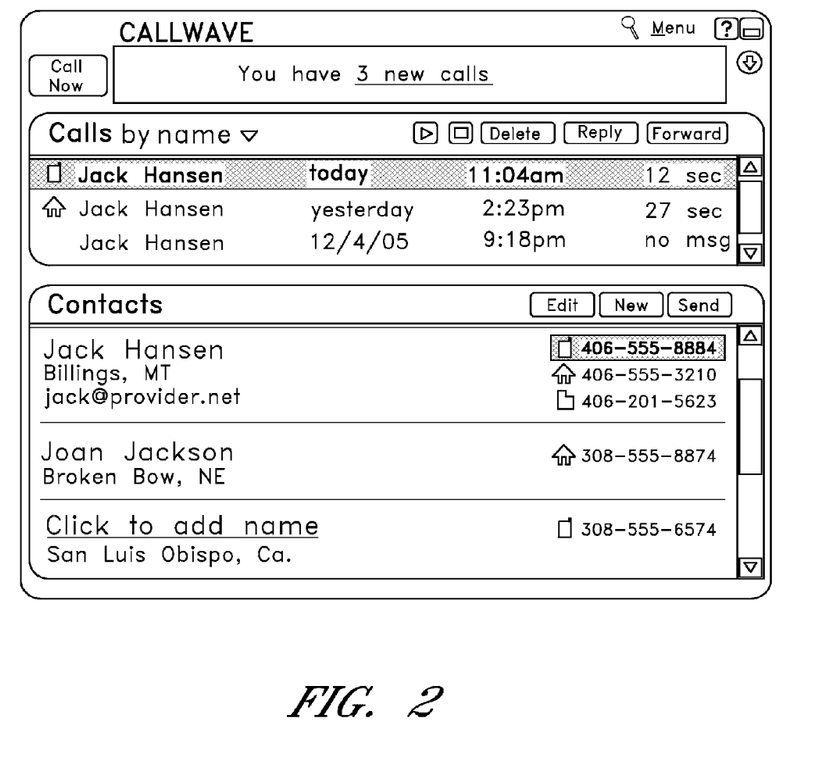
FIG. 2 illustrates a first example telecommunications client call log and user contacts user interface with Reply, Forward, and Send buttons.

Referring to FIG. 2, an example call log user interface, such as one that can be displayed via the telecommunications client, is illustrated. In this example interface, a call is indicated by an entry in the log. A log entry can include some or all of the following: a caller name, a caller phone address/identifier, a call time/date, a call type, a message/fax length (where a message has been recorded or a fax received), an indication as to whether the user has viewed the log entry, an indication as to whether the user has played a recorded caller message (where a message has been recorded), an indication as to whether the user has viewed a fax (where a fax has been received), etc. In addition, the number of new calls received is displayed in a status field.

A telecommunications client is just an example user interface. FIG. 3 illustrates another example call log user interface presented via a browser to a customer. The browser can be executing on a computer terminal, such as a personal computer, a Wireless Application Protocol (WAP)-enabled phone, a smart phone, a PDA or the like. The call log can be accessed by supplying the appropriate URL to the browser and optionally providing log-on information, such as a user name and a password. Optionally, the call log is accessed via a widget hosted on a Web page, such as a social networking web page associated with the user.

Figure 4:
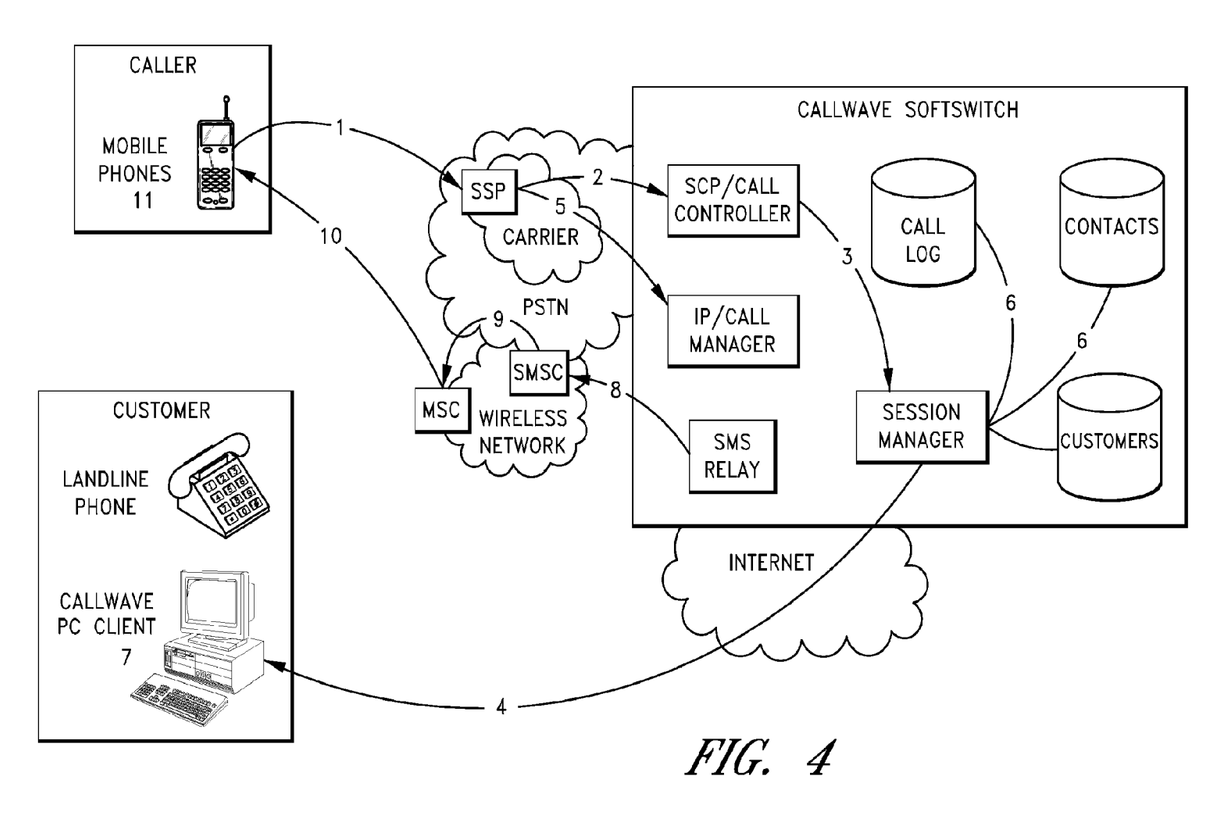
FIG. 4 illustrates an example operating environment/process where a message delivery notification is sent in response to a call.

FIG. 4 depicts an example call scenario in which a caller dials a called party's phone. The called party, a subscriber to a telecommunications service offering, is unavailable and a message is recorded by the call processing system (e.g., stored on volatile or nonvolatile memory). The caller is prompted to select or otherwise specify a message delivery notification type. The caller selects a message delivery notification type. The caller message is then transmitted or otherwise provided/played back to the called party. When the subscriber accesses the recorded message and/or after the subscriber listens to the recorded voice message, a delivery notification message is transmitted to the caller.

State 1. A Caller dials the customer's landline phone number/address (or other phone-type, such as a wireless or VoIP phone)). The call is routed, in this example, through the PSTN to a carrier (e.g., a CP). In this example, the call is routed to a carrier's Service Switching Point (SSP) serving the customer's landline phone.

State 2. Because the called party is unavailable in this example, the call is not answered by the called party. After a specified number of rings (e.g., a Ring-No-Answer Condition) and/or after a specified amount of time, the SSP forwards the call to a softswitch (e.g., an Enhanced Service Provider softswitch and/or Call Processing System, such as that illustrated in FIG. 1). In the forwarded call, the SSP includes some or all of the call signaling information associated with the call, including, for example, the caller phone number/address, the caller charge number, a privacy indicator, a designation of whether the call was a forwarded call, and/or the called party identifier (e.g., phone number/address or account number).

State 3. The receiving softswitch verifies the called phone number or other called party identifier is that of a customer (e.g., a subscriber of a service offered by the operator of the softswitch and/or other entity having an account associated with the softswitch), optionally by determining if the called phone number or other identifier associated with the called party matches a customer number/identifier in the customer database (which stores customer account records). The softswitch SCP/Call Controller queries the softswitch Session Manager to obtain some or all of the following: service configuration for the customer being called, the customer's call location, the customer's online status (e.g., online or offline), and contact information for the caller.

State 4. Optionally, the Session Manager notifies the customer's telecommunications client on the SCP/Call Controller's behalf that there is an incoming call. The client displays the call in its active call window (e.g., a call alert user interface).

State 5. The Call Manager begins playing a greeting (e.g., a standard system greeting or a greeting prerecorded by the customer, such as one that states the customer is unavailable and to leave a message after the tone). A message from the caller is recorded. The caller is presented with one or more message delivery notification options (e.g., via an audible prompt or a Web page visual user interface). The caller selects or otherwise specifies the message delivery notification type to be used, and then the call terminates (e.g., the caller hangs-up or the call processing system hangs-up).

State 6. The Call Manager logs the call (e.g., in a call log database) and optionally updates the call frequency information for the contact (e.g., the Call Manager tracks the total number of calls received from a given phone number and/or caller, wherein the "total number of calls" can be the total number of calls received from a specific date, calls received, within a specified time period, or otherwise). The telecommunications client or call log web page clears the active call display and optionally adds the call to the top of the call log. Optionally, the recorded message is transmitted to the email address of the subscriber (e.g., as an attached audio file, via a link to a corresponding audio file, etc.).

State 7. The subscriber/called party goes online (e.g., using a networked computer, interactive television, or smart phone). A list of missed calls and recorded messages are displayed in the subscriber's telecommunications client or via a browser. Optionally, the log can further include call entries corresponding to calls that the subscriber did not miss (e.g., that the subscriber participated in). The subscriber reviews the recorded message (e.g., plays back the recorded message in whole or in part).

State 8. Upon message review (e.g., when the subscriber initiates message playback, during message playback, or after message playback), a Short Message Service relay within the call processing system composes a message delivery notification Short Message (SM) or other specified message type, addresses it to the caller's mobile phone (or other device capable of receiving Short Messages or other specified message type) and sends the message to a Short Message Switching Center (SMSC) (or other device capable of sending text messages or other specified message type over a network). Optionally, in addition or instead, a message delivery notification is transmitted to an email address or other destination associated with the caller. The notification can optionally specify the date and time (e.g., specified using the caller's local time) of the message review.

State 9. The SMSC transmits the notification message to the MSC.

State 10. The MSC transmits a notification to the mobile phone informing the mobile phone (or other designated communications device) that the called party has reviewed or received the voice message they recorded earlier. In response, the mobile phone displays via a phone display an icon and/or text indicating that there is an SM waiting.

Figure 5:
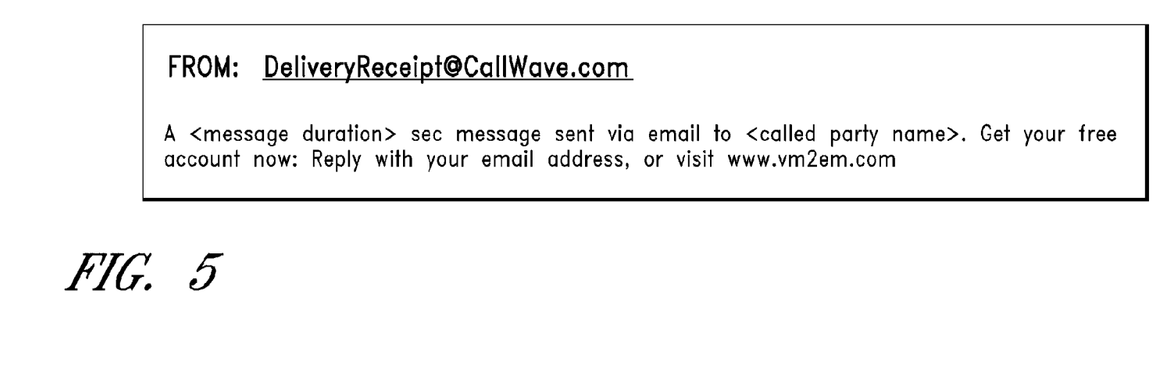
FIG. 5 illustrates a first example text message delivery notification.
Figure 6:
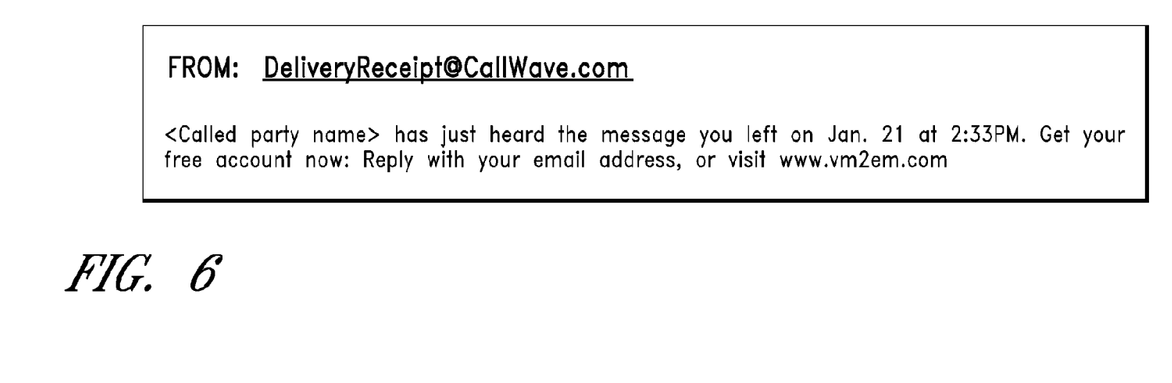
FIG. 6 illustrates a second example text message delivery notification.

State 11. The caller notices the message waiting icon and/or text and requests to view the SM (e.g., via a menu selection, by clicking on an entry corresponding to the SM, or otherwise). Optionally, a message similar to those illustrated in FIG. 5 or FIG. 6 is displayed on the cell phone.

Optionally, at state 5 above, instead, the customer is instructed at the time of the recording of his/her greeting to include instructions on how a caller can receive a message delivery notification. Optionally, the call processing system can play a brief prerecorded voice prompt before or after the greeting informing the caller of the message delivery notification option or general options. Example prerecorded voice prompts include: "Record your message after the tone, keypress # for additional options.", "Record your message after the tone, keypress # to receive a message delivery notification." If the caller keypresses "#", a message delivery notification is enabled on the call processing system or the caller is presented with the option to, for example, press 1 to request a message delivery notification.

In state 5 above, the call processing system can selectively prompt the caller for the message delivery option based on the following example criteria:

A query determines the calling party is calling from a text capable device or a multimedia message capable phone (e.g., a cell phone), wherein the notification is provided in a form acceptable by the phone, and if the phone is not capable of receiving a text message (e.g., an SMS message) or a multimedia message (e.g., an MMS message), the notification is not so provided;

A query determines the subscriber to the telecommunication service has allowed message delivery options for this caller (e.g., based on a configuration option associated with a contact record);

A threshold limit has been exceeded whereby additional message delivery notifications are not allowed (e.g., wherein the notification option is not presented to the caller if the threshold has been exceeded);

A class of service that allows or restricts message delivery notifications for accounts; or, Other criteria.

At state 5 above, the call processing system may determine at the beginning of the call the caller is calling from a non-textable device (e.g. by looking up the phone number in a database such as a LERG database (e.g., Telcordia's LERG database) and/or by querying a Local Number Portability database to determine the device type). In this case, the call processing system can optionally prompt the subscriber to provide a destination identifier corresponding to a destination where the message delivery notification can be transmitted. For example, the subscriber may be requested to keypress or speak the phone number of a textable device, an email address, and/or an instant messaging address. Optionally, the message delivery notification can be provided via an automatically generated voice message to the phone the caller used to call the called party. Optionally, the system asks the caller to provide a phone address to which such voice message is to be provided.

In certain instances, at state 5 above, the call processing system may determine at the beginning of the call, (e.g., based on a query) that the calling party has multiple devices/addresses where a message delivery notification could be received. For example, the system can query the subscriber's contact record (e.g., stored in a system database, stored on the subscriber's personal computer, etc.) for the caller to identify a caller cell phone number/SMS address and email address. In this case, the system can optionally prompt the caller to choose where the caller would prefer the notification to be delivered (optionally including a notification to all addresses).

Optionally, the system defaults to a certain address-type, such as the caller's email address by way of example, or the subscriber to the telecommunication service could specify the destination. By way of example, the subscriber can select a destination address in a contact record for the caller (e.g., via a drop down menu or otherwise).

Optionally, at state 5 above, the call processing system can enable the caller to select one or more of the following communication-types via which the message delivery notification is to be provided to the caller:
  an email message;
  an instant message;
  an outbound call notification;
  an SMS;
  an MMS;
  a voice notification;
  other notification options; or
  all of the above.

Optionally, the system can default to one of the above options and optionally announce to the caller how the message delivery notification will be transmitted.

At state 6 above, the call processing system can optionally notify the caller once the message has been transmitted by the call processing system and before the message has been reviewed (e.g., delivered to a telecommunication client running on a called party's computer, delivered to a called party's email address, etc.). The notification can optionally specify the date and time (e.g., specified using the caller's local time) of the transmission.

At state 7 above, the subscriber optionally could have called in via a telephone user interface. At the beginning or end of the review of each message, the call processing system optionally prompts the subscriber if the subscriber would like to prevent the caller from being notified of the message delivery/review. Optionally, the system does not voice prompt the subscriber regarding the message delivery/review notification. Optionally, the call processing system remembers (e.g., via an entry stored in the subscriber's contact records) if a message delivery notification is allowed on review and only voice prompts the subscriber if a message delivery notification behavior has not been specified.

At state 8 above, the subscriber optionally could have received the message via an email received by an email system utilized by the subscriber (e.g., as a file, as a link to a file, etc.). Optionally, the call processing system detects the review of the message (e.g., by detecting when the subscriber clicked on a playback link in the body of the email which is associated with the call processing system). In this example, the message review may involve the streaming of the voice message over the Internet from a message storage system within the call processing system to a playback device (e.g., a personal computer, a telephone, etc.). Other methods to detect when a message has been received or reviewed by a recipient of an email message can be used as well. One or more of these message review detection methods can be used to cause a message receipt notification to be sent the caller.

At state 8 above, the subscriber, when reviewing his/her message, is optionally prompted (audibly and/or visually) as to whether the subscriber wants to prevent/inhibit the sending of a message delivery notification to the caller. Optionally, the subscriber can be prompted to select which message delivery address she or he would prefer to use for the notification.

At state 9 above, the notification optionally includes the original voice message recorded by the caller for context or a portion thereof (e.g., the first 5 seconds or other designated amount). This can optionally be determined by the call processing system (e.g., based on the notification type (e.g., SMS, MMS, instant message, email, etc.), specified by the caller, or specified by the called party/subscriber). For example, when sending a notification to an SMS address, the system is optionally configured not to include the original voice message with the notification. However, if the system is transmitting the notification to an MMS address, the system is optionally configured to (automatically or in response to a caller instruction) include the original voice message.

FIG. 5 illustrates an example SMS message delivery notification. In this example, the FROM field is set to a generic service provider email address. Optionally, the FROM field can be set to a Mobile Short Code (e.g., four to six digits, that mobile phone users utilize to send Short Message Service (SMS) messages to in order to receive information) in order to enable two-way messaging back to the service provider and/or called party. In this example, the text of the message includes the called party's name and the duration of the message in seconds the caller originally left. This example also includes a promotion from the service provider describing how the caller could sign up for the call answering service. This example notification describes an option whereby the caller can reply to the Text Message with an email address to receive additional information about the service.

FIG. 6 illustrates an example SMS message review notification. In this example, the FROM field is set to a generic service provider email address. Optionally, the FROM field can be set to a Mobile Short Code in order to enable two-way messaging back to the service provider and/or called party. In this example, the text of the message includes the called party's name and when the message was reviewed/heard by the recipient. Optionally, the time is set to the time zone of the calling party. This example also includes a promotion from the service provider describing how they can sign up for the call answering service. This example also describes an option whereby the caller can reply to the Text Message with an email address to receive additional information about the service.

It should be understood that certain variations and modifications of this invention would suggest themselves to one of ordinary skill in the art. The scope of the present invention is not to be limited by the illustrations or the foregoing descriptions thereof.

What is claimed is:

1. A method of providing a message played notification, comprising:
   providing a software program for a mobile computing device associated with a first user;
   storing one or more phone addresses in one or more contact records, wherein at least a portion of the one or more phone addresses are associated with one or more inbound calls directed to the mobile computing device associated with the first user;
   wherein the one or more contact records are stored in a contacts data store accessible by the software program installed on the mobile computing device of the first user;
   receiving at the software program, installed on the mobile computing device of the first user, a voice message directed to the first user wherein the voice message originated from a second user, wherein the second user is associated with a contact record in the contacts data store;
   providing a user interface via the software program, installed on the mobile computing device of the first user, by which the received voice message can be played by the first user; and
   at least partly in response to receiving a first indication that the software program has played a portion of the received voice message while the software program, installed on the mobile computing device of the first user, is online, automatically transmitting a corresponding notification to the second user.

2. The method as defined in claim 1, wherein the played portion of the received voice message comprises the entire length of the received voice message.

3. The method as defined in claim 1, wherein the notification provides the second user with access to at least a portion of the voice message.

4. The method as defined in claim 1, the method further comprising:
   converting the voice message into a text message, wherein the notification includes at least a portion of the text message.

5. The method as defined in claim 1, the method further comprising:
   detecting, via one or more network-based servers, an online presence of the software program.

6. The method as defined in claim 1, the method further comprising:
   providing via the user interface a control which enables the first user to inhibit the automatic transmission of the notification.

7. The method as defined in claim 1, the method further comprising:
   alerting the first user of the receipt of the voice message via the software program.

8. A method of providing a receipt notification, comprising:
   providing a software program for a computing device associated with a first user;
   receiving at the software program, installed on the computing device of the first user, a voice message directed to the first user, wherein the voice message originated from a second user wherein the second user is associated with a contact record of the user;
   providing a user interface via the software program, installed on the computing device of the first user, by which the received voice message can be played by the first user, wherein a voice message player of the software program includes at least a play control and provides for display of a time duration of the voice message; and
   while the software program is online, at least partly in response to receiving a first indication that the software program, installed on the computing device associated with the first user, has played the received voice message, automatically transmitting a corresponding notification to the second user.

9. The method as defined in claim 8, wherein the first indication that the user has played the voice message comprises the playing of at least a portion of the voice message.

10. The method as defined in claim 8, wherein the first indication that the user has played the voice message comprises the playing of the entire length of the voice message.

11. The method as defined in claim 8, wherein the notification provides the second user with access to at least a portion of the voice message.

12. The method as defined in claim 8, the method further comprising:
    converting the voice message into a text message, wherein the notification includes at least a portion of the text message.

13. The method as defined in claim 8, the method further comprising:
    providing via the user interface a control which enables the first user to inhibit the automatic transmission of the notification.

14. The method as defined in claim 8, the method further comprising:
    detecting, via one or more network-based servers, an online presence of the software program.

15. The method as defined in claim 8, the method further comprising:
    alerting the first user of the receipt of the voice message via the software program.

16. A mobile computing device associated with a first user comprising:
    a data store configured to store computer-executable instructions, including a software program; and
    a hardware processor in communication with the data store, the hardware processor, configured to execute the computer-executable instructions, including the software program, to at least:
    store one or more phone addresses in one or more contact records, wherein at least a portion of the one or more phone addresses are associated with one or more inbound calls directed to the mobile computing device associated with the first user;
    wherein the one or more contact records are stored in a contacts data store accessible by the software program of the mobile computing device associated with the first user;
    receive at the software program of the mobile computing device associated with the first user a voice message directed to the first user wherein the voice message originated from a second user, wherein the second user is associated with a contact record in the contacts data store;

provide a user interface via the software program of the mobile computing device associated with the first user, by which the received voice message can be played by the first user; and at least partly in response to a first indication that the software program has played a portion of the received voice message while the software program of the mobile computing device associated with the first user is online, enable a corresponding notification to be automatically transmitted to the second user.

17. The mobile computing device as defined in claim 16, wherein the played portion of the received voice message comprises the entire length of the received voice message.

18. The mobile computing device as defined in claim 16, wherein the notification provides the second user with access to at least a portion of the voice message.

19. The mobile computing device as defined in claim 16, wherein the hardware processor is configured to execute the computer-executable instructions to:

wherein the notification includes a text message comprising a conversion of at least a portion of the voice message to text.

20. The mobile computing device as defined in claim 16, wherein the hardware processor is configured to execute the computer-executable instructions to:

provide an indication to one or more network-based servers of an online presence of the software program.

21. The mobile computing device as defined in claim 16, wherein the hardware processor is configured to execute the computer-executable instructions to:

provide via the user interface a control which enables the first user to inhibit the automatic transmission of the notification.

22. The mobile computing device as defined in claim 16, wherein the hardware processor is configured to execute the computer-executable instructions to:

alert the first user of the receipt of the voice message.

23. A mobile computing device associated with a first user comprising:

a data store configured to store computer-executable instructions, including a software program; and a hardware processor in communication with the data store, the hardware processor, configured to execute the computer-executable instructions, including the software program, to at least:

receive at the software program of the mobile computing device associated with the first user a voice message directed to the first user, wherein the voice message originated from a second user wherein the second user is associated with a contact record of the user;

provide a user interface via the software program of the mobile computing device associated with the first user by which the received voice message can be played by the first user, wherein a voice message player of the software program includes at least a play control and provides for display of a time duration of the voice message; and at least partly in response to a first indication that the software program of the mobile computing device associated with the first user has played the received voice message, enable a corresponding notification to be automatically transmitted to the second user.

24. The mobile computing device as defined in claim 23, wherein the first indication that the user has played the voice message comprises the playing of at least a portion of the voice message.

25. The mobile computing device as defined in claim 23, wherein the first indication that the user has played the voice message comprises the playing of the entire length of the voice message.

26. The mobile computing device as defined in claim 23, wherein the notification provides the second user with access to at least a portion of the voice message.

27. The mobile computing device as defined in claim 23, wherein the hardware processor is configured to execute the computer-executable instructions to:

wherein the notification includes a text message comprising a conversion of at least a portion of the voice message to text.

28. The mobile computing device as defined in claim 23, wherein the hardware processor is configured to execute the computer-executable instructions to:

provide via the user interface a control which enables the first user to inhibit the automatic transmission of the notification.

29. The mobile computing device as defined in claim 23, wherein the hardware processor is configured to execute the computer-executable instructions to:

provide an indication to one or more network-based servers of an online presence of the software program.

30. The mobile computing device as defined in claim 23, wherein the hardware processor is configured to execute the computer-executable instructions to:

alert the first user of the receipt of the voice message via the software program.

* * * * *